(12) United States Patent
Enzaki

(10) Patent No.: US 10,895,331 B2
(45) Date of Patent: Jan. 19, 2021

(54) VACUUM VALVE

(71) Applicant: SMC CORPORATION, Chiyoda-ku (JP)

(72) Inventor: Akira Enzaki, Bando (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/442,647

(22) Filed: Jun. 17, 2019

(65) Prior Publication Data

US 2019/0390792 A1    Dec. 26, 2019

(30) Foreign Application Priority Data

Jun. 22, 2018  (JP) .................................. 2018-119238

(51) Int. Cl.
*F16K 31/122*  (2006.01)
*F16K 3/18*    (2006.01)
*F16K 51/02*   (2006.01)

(52) U.S. Cl.
CPC .......... *F16K 31/1225* (2013.01); *F16K 3/182* (2013.01); *F16K 51/02* (2013.01);
(Continued)

(58) Field of Classification Search
CPC .... F16K 51/02; F16K 39/024; F16K 31/1225; F16K 41/10; F16K 1/526; F16K 1/44;
(Continued)

(56) References Cited

U.S. PATENT DOCUMENTS

| 4,041,979 A | 8/1977 | Grotloh |
| 5,263,679 A * | 11/1993 | Bushnell ............... F16K 39/024 |
| | | 137/630.14 |

(Continued)

FOREIGN PATENT DOCUMENTS

| JP | 52-16017 | 2/1977 |
| JP | 58-130350 U | 9/1983 |

(Continued)

OTHER PUBLICATIONS

Extended European Search Report dated Oct. 24, 2019 in European Patent Application No. 19177198.9, 8 pages.

*Primary Examiner* — Atif H Chaudry
(74) *Attorney, Agent, or Firm* — Oblon, McClelland, Maier & Neustadt, L.L.P.

(57) ABSTRACT

A vacuum valve includes a main flow channel that connects the first port and the second port, a main valve seat that surrounds the main flow channel, a main valve disc that opens and closes the main flow channel by contacting and separating from the main valve seat, a sub-flow channel that is formed inside the main valve disc, a sub-valve seat that is formed on an outer surface of the main valve disc, a sub-valve disc that opens and closes the sub-flow channel by contacting and separating from the sub-valve seat at a position outside the main valve disc, and a rod that causes the main valve disc and the sub-valve disc to open and close. The sub-valve disc opens and closes the sub-flow channel by being operated directly by the rod, and the main valve disc opens and closes the main flow channel by being operated via the sub-valve disc by the rod.

6 Claims, 7 Drawing Sheets

(52) U.S. Cl.
CPC ............... *Y10T 137/86944* (2015.04); *Y10T 137/86976* (2015.04); *Y10T 137/86984* (2015.04); *Y10T 137/87121* (2015.04); *Y10T 137/87378* (2015.04)

(58) Field of Classification Search
CPC ..... Y10T 137/86976; Y10T 137/86944; Y10T 137/87378; Y10T 137/87121; Y10T 137/86984
See application file for complete search history.

(56) References Cited

U.S. PATENT DOCUMENTS

| | | | |
|---|---|---|---|
| 5,848,608 A | 12/1998 | Ishigaki | |
| 6,289,932 B1* | 9/2001 | Thackeray | F16K 39/024 137/630.15 |
| 2001/0023709 A1* | 9/2001 | Furutate | F16K 39/024 137/556 |
| 2002/0027211 A1* | 3/2002 | Kajitani | F16K 51/02 251/63.6 |
| 2002/0195148 A1 | 12/2002 | Muller et al. | |
| 2005/0253100 A1 | 11/2005 | Yasue et al. | |
| 2007/0007475 A1 | 1/2007 | Zvokelj et al. | |
| 2012/0126159 A1* | 5/2012 | Lee | F16K 51/02 251/318 |
| 2012/0153193 A1* | 6/2012 | Gu | F16K 31/1225 251/28 |

FOREIGN PATENT DOCUMENTS

| | | |
|---|---|---|
| JP | 9-137879 | 5/1997 |
| JP | 2007-16996 | 1/2007 |
| WO | WO 92/08918 A1 | 5/1992 |

\* cited by examiner

VACUUM VALVE

TECHNICAL FIELD

The present invention relates to a vacuum valve, and, in particular, to a vacuum valve in which a main valve portion having a large opening degree and a sub-valve portion having a small opening degree are arranged in parallel in order to open and close in a stepwise manner a flow channel that connects two ports.

BACKGROUND ART

As disclosed in PTLs 1 to 3, a vacuum valve in which a main valve portion having a large opening degree and a sub-valve portion having a small opening degree are arranged in parallel in order to open and close in a stepwise manner a flow channel that connects two ports is known. For example, a vacuum valve of this type is connected between a vacuum chamber and a vacuum pump in a semiconductor processing apparatus, and is used in a case of reducing the pressure of the vacuum chamber.

However, the known vacuum valve is configured in such a way that: inside a main valve disc of the main valve portion, a sub-flow channel having a small sectional area and a sub-valve seat surrounding the sub-flow channel are provided and a sub-valve disc is accommodated; and by displacing the sub-valve disc in the main valve disc, the sub-valve disc is made to contact and separate from the sub-valve seat to open and close the sub-flow channel. Therefore, there is a problem in that the size of the main valve disc increases and at the same time the structure of the main valve disc becomes complex, and these are likely to lead to increase in size and structural complexity of the entirety of the vacuum valve.

CITATION LIST

Patent Literature

[PTL 1] Japanese Unexamined Patent Application Publication No. 52-16017
[PTL 2] Japanese Unexamined Patent Application Publication No. 9-137879
[PTL 3] Japanese Unexamined Patent Application Publication No. 2007-16996

SUMMARY OF INVENTION

Technical Problem

A technical object of the present invention is to reduce the size and simplify the structure of a vacuum valve by improving a main valve disc and a sub-valve disc of the vacuum valve.

Solution to Problem

To achieve the object, a vacuum valve according to the present invention includes: a first port and a second port formed in a housing; a main flow channel formed inside the housing so as to connect the first port and the second port; a main valve seat that surrounds the main flow channel; a main valve disc that opens and closes the main flow channel by contacting and separating from the main valve seat; a sub-flow channel that is formed inside the main valve disc so as to be in parallel with the main flow channel; a sub-valve seat that is formed on the main valve disc so as to surround the sub-flow channel; a sub-valve disc that opens and closes the sub-flow channel by contacting and separating from the sub-valve seat; and an opening-closing operation mechanism that performs operations of opening and closing the main valve disc and the sub-valve disc. A rod is disposed inside the housing so as to slidably extend through the main valve disc, the opening-closing operation mechanism is coupled to a base end portion that is one end of the rod in an axial line direction, the sub-valve disc is disposed at a tip end portion that is the other end of the rod in the axial line direction so as to contact and separate from the main valve disc at a position outside the main valve disc, and the sub-valve seat is formed on a part of an outer surface of the main valve disc that the sub-valve disc contacts. The sub-valve disc opens and closes the sub-flow channel by being operated directly by the rod, and the main valve disc opens and closes the main flow channel by being operated via the sub-valve disc by the rod.

In the present invention, the rod includes a first rod portion on a tip end side and a second rod portion on a base end side, the first rod portion and the second rod portion being separably coupled; the first rod portion extends through the main valve disc, and the sub-valve disc is provided at a tip end of the first rod portion; the second rod portion is coupled to the opening-closing operation mechanism; and the main valve disc is removable from the rod by separating the first rod portion from the second rod portion.

In this case, preferably, the main valve disc includes a disc member that contacts and separates from the main valve seat and a cylindrical member that is formed independently from the disc member and is combined with the disc member; the sub-flow channel is formed between the disc member and the cylindrical member, and the sub-valve seat is formed on the disc member; and a bearing member that guides the rod and a seal member that seals a space between an inner periphery of the cylindrical member and an outer periphery of the rod are provided on an inner periphery of the cylindrical member.

Preferably, a spring receiving member having a tubular shape is attached to the rod in such a way that, although the spring receiving member is displaceable along the rod, the spring receiving member becomes inseparable from the second rod portion by engaging with the second rod portion; a tubular cover portion into which the cylindrical member of the main valve disc is fitted, a first spring seat, and a second spring seat are provided in the spring receiving member; a main valve spring that urges the main valve disc in a direction such that the main valve disc contacts the main valve seat is interposed in a compressed state between the first spring seat and a main spring seat that is formed in the housing; a sub-valve spring that urges the sub-valve disc via the rod in a direction such that the sub-valve disc contacts the sub-valve seat is interposed in a compressed state between the second spring seat and a sub-spring seat that is formed in the rod; and one end of a bellows that surrounds the main valve spring and the sub-valve spring is coupled to the main valve disc, and the other end of the bellows is coupled to the housing.

In the present invention, the sub-valve disc may separate from the sub-valve seat and open the sub-flow channel due to an advancing motion of the rod; and the main valve disc may become displaced via the sub-valve disc, separate from the main valve seat, and open the main flow channel due to a retreating motion of the rod.

Moreover, the opening-closing operation mechanism is formed of one fluid-pressure cylinder and includes a piston that is coupled to the rod, a first pressure chamber that is formed on one side of the piston, and a second pressure chamber that is formed on the other side of the piston; the piston is coupled to the rod; when a pressure fluid is supplied to the first pressure chamber, the piston and the rod advance and the sub-valve disc opens the sub-flow channel; and, when a pressure fluid is supplied to the second pressure chamber, the piston and the rod retreat and the main valve disc opens the main flow channel.

The vacuum valve may include an opening-degree adjustment mechanism that adjusts an opening degree of the sub-valve disc, the opening-degree adjustment mechanism includes an adjustment nut that is rotationally operable through an operation opening that is formed in a side surface of the housing and a stopper with which the adjustment nut meshes, the stopper is displaceable in the axial line direction by rotationally operating the adjustment nut, and the opening degree of the sub-valve disc is adjusted in accordance with a position of the stopper.

Advantageous Effects of Invention

In a vacuum valve according to the present invention, a sub-valve seat is provided outside a main valve disc and the sub-valve seat is opened and closed by a sub-valve disc that is disposed outside the main valve disc. Therefore, it is possible to reduce the size and simplify the structure of a vacuum valve, compared with an existing vacuum valve in which a sub-valve seat that is provided inside a main valve disc is opened and closed by a sub-valve disc that is accommodated inside the main valve disc.

DESCRIPTION OF EMBODIMENTS

Figures illustrate an embodiment of a vacuum valve. The vacuum valve is connected between a vacuum chamber and a vacuum pump in a semiconductor processing apparatus, and is used to reduce the pressure of the vacuum chamber.

Figure 1:
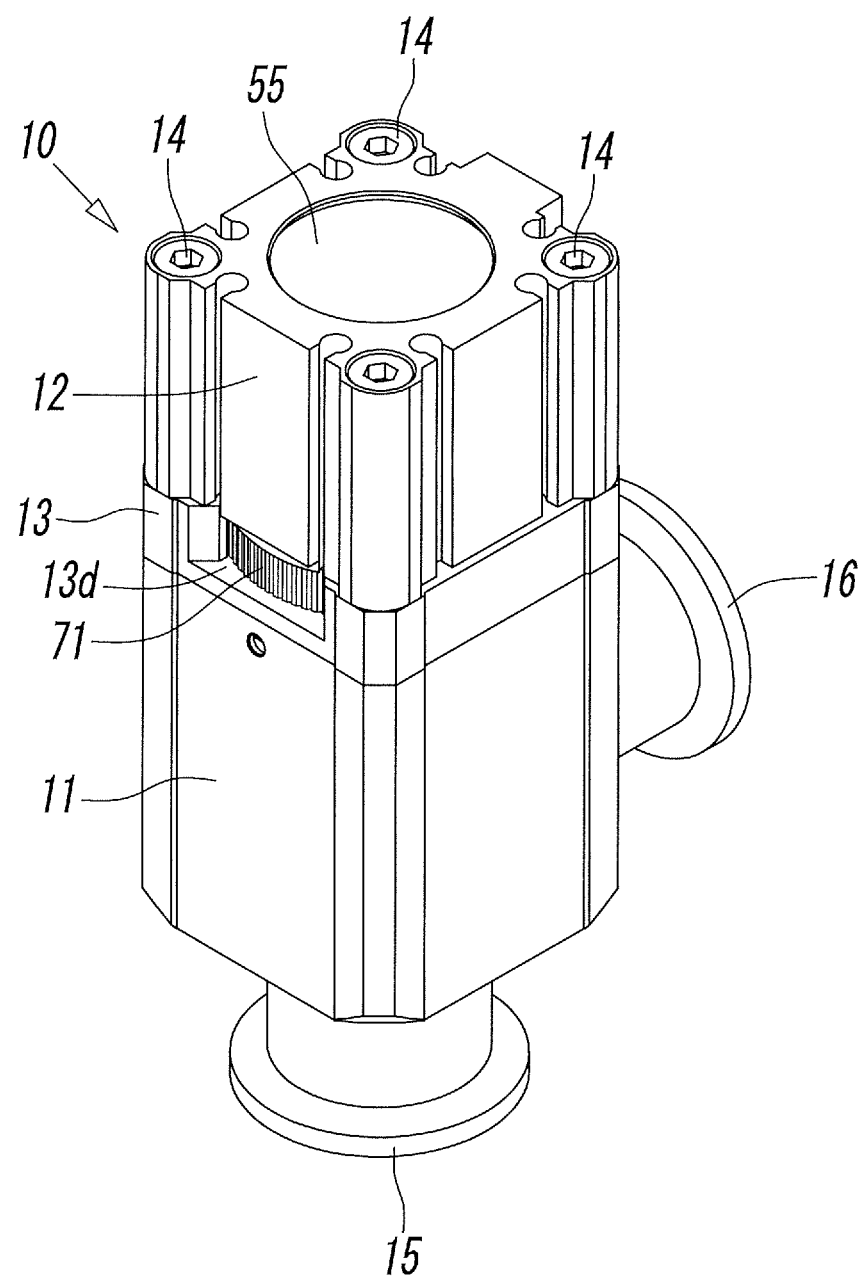
FIG. 1 is a perspective view of a vacuum valve according to the present invention.
Figure 2:
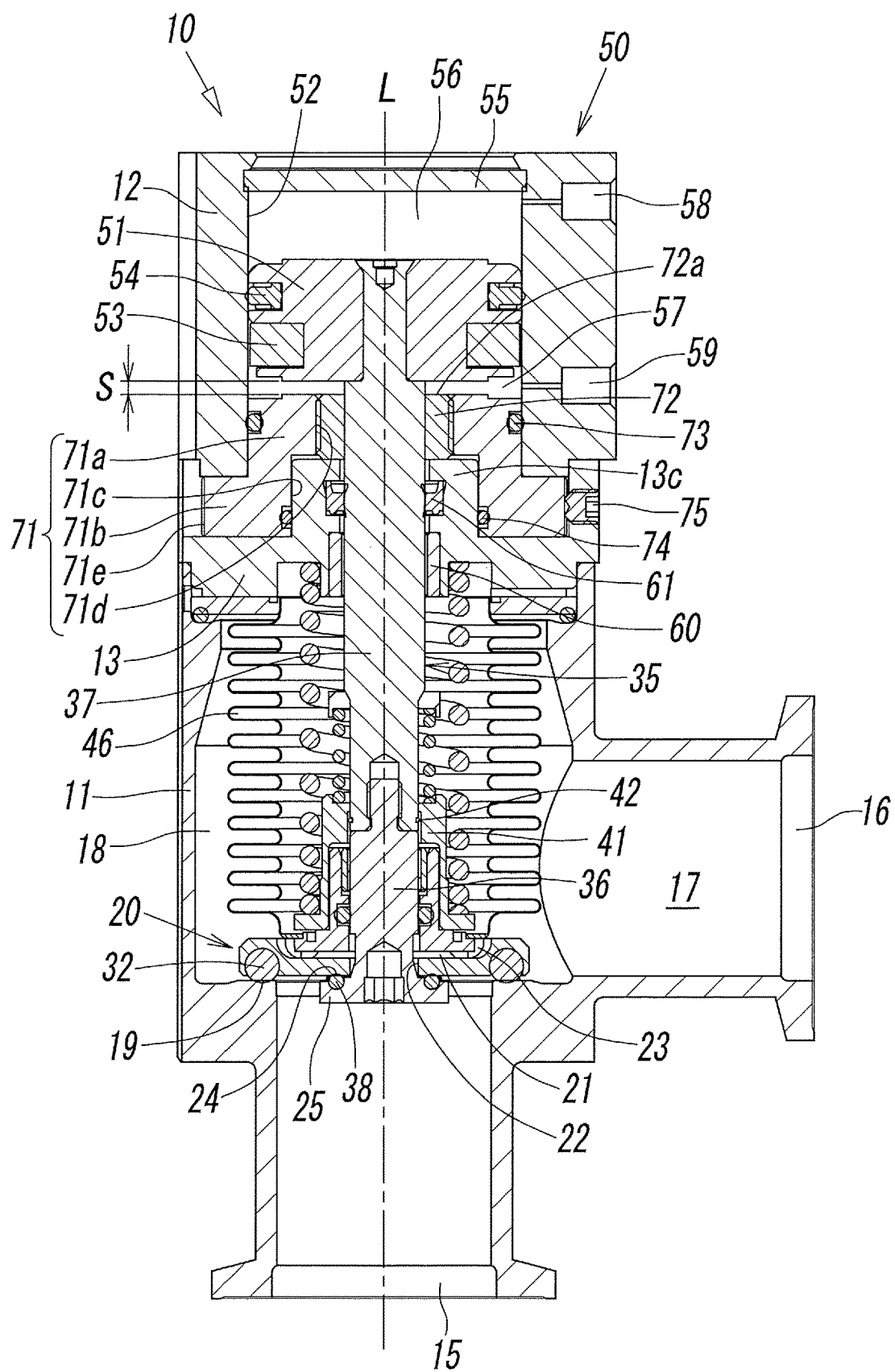
FIG. 2 is a central longitudinal sectional view of the vacuum valve of FIG. 1 in a state in which both of a main flow channel and a sub-flow channel are closed.
Figure 3:
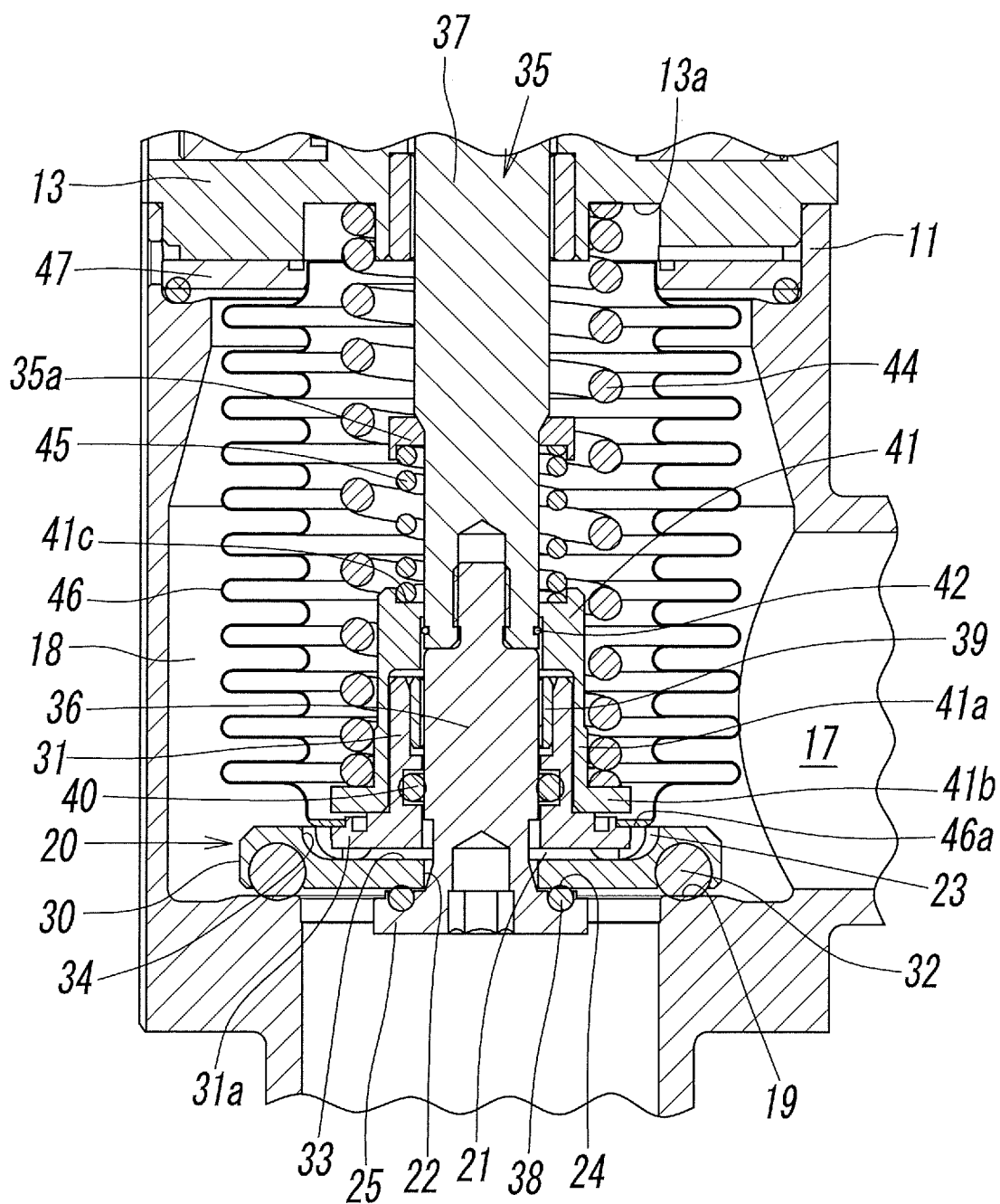
FIG. 3 is a partial enlarged view of FIG. 2.

As is clear from FIGS. 1 to 3, the vacuum valve includes a housing 10 having a rectangular shape in plan view. The housing 10 is formed by joining a hollow first housing member 11 and a hollow second housing member 12 in an axial line L direction via a rectangular partition wall member 13 by using a plurality of coupling screws 14.

The first housing member 11 has a first port 15 that opens in the axial line L direction and a second port 16 that opens in a direction perpendicular to the axial line L. A main flow channel 17, which connects the first port 15 and the second port 16, is formed inside the first housing member 11.

One of the first port 15 and the second port 16 (for example, the second port 16) is connected to a vacuum chamber of a semiconductor manufacturing apparatus, and the other (for example, the first port 15) is connected to a vacuum pump.

A valve chamber 18 is formed in a part of the main flow channel 17. Inside the valve chamber 18, an annular main valve seat 19, which surrounds the main flow channel 17 at a position on the axial line L, is formed, and a main valve disc 20, which opens and closes the main flow channel 17 by contacting and separating from the main valve seat 19, is accommodated.

Inside the main valve disc 20, a sub-flow channel 21 is formed in parallel with the main flow channel 17. One end of the sub-flow channel 21 communicates with the first port 15 through a first opening 22 that opens in a lower surface of the main valve disc 20. The other end of the sub-flow channel 21 communicates with the second port 16 through a second opening 23 that opens in an upper surface of the main valve disc 20. The cross-sectional area of the sub-flow channel 21 is smaller than the cross-sectional area of the main flow channel 17.

On the lower surface of the main valve disc 20, an annular sub-valve seat 24 is formed so as to surround the first opening 22 of the sub-flow channel 21 at a position on the axial line L. Below the main valve disc 20, a plate-shaped sub-valve disc 25 is disposed so as to contact and separate from the sub-valve seat 24 at a position outside the main valve disc 20. The sub-flow channel 21 is opened and closed by the sub-valve disc 25. The diameter of the sub-valve disc 25 is smaller than the diameter the main valve disc 20.

As described above, the sub-valve seat 24 is provided outside the main valve disc 20, and the sub-valve seat 24 is opened and closed by the sub-valve disc 25, which is disposed outside the main valve disc 20. Therefore, it is possible to reduce the size and simplify the structure of the vacuum valve, compared with an existing vacuum valve in which a sub-valve seat that is provided inside a main valve disc is opened and closed by using a sub-valve disc that is accommodated inside the main valve disc.

Figure 4:
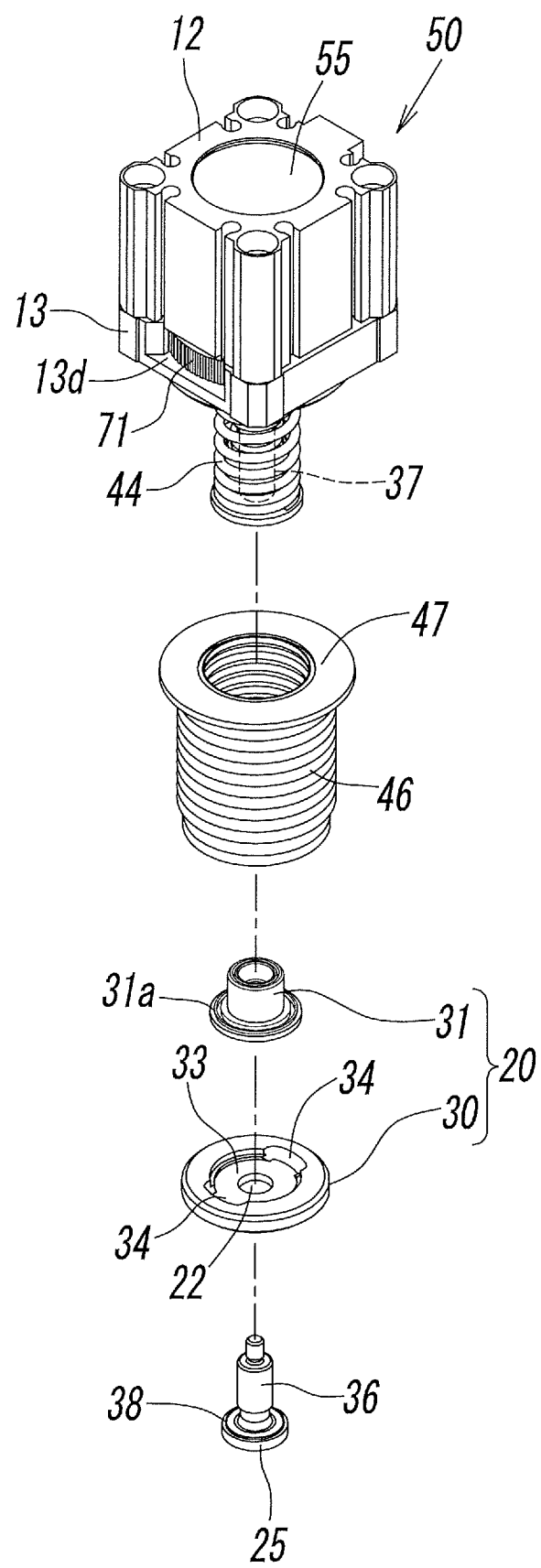
FIG. 4 is a partially exploded perspective view of the vacuum valve of FIG. 1 from which a first housing member, which is a part of a housing, is omitted.

As is clear from FIG. 4, the main valve disc 20 is formed of a disc member 30 and a cylindrical member 31, which has a smaller diameter than the disc member 30.

An annular main valve seal 32, which contacts and separates from the main valve seat 19, is attached to a lower surface of the disc member 30. A circular recess 33 is formed in an upper surface of the disc member 30. The first opening 22 is formed at a central position of a bottom surface of the recess 33. Cutout portions 34, which form the second opening 23, are formed at opposite positions in a diametrical direction of the recess 33.

The cylindrical member 31 has a fitting portion 31a, which has a flange-like shape, at a lower end portion thereof. By fitting the fitting portion 31a into the recess 33 of the disc member 30, the cylindrical member 31 and the disc member 30 are combined with each other. Between the cylindrical member 31 and the disc member 30, the sub-flow channel 21, which connects the first opening 22 and the second opening 23, is formed. In this case, the disc member 30 and the cylindrical member 31 may be fixed to each other by using a method such as press-fitting. However, preferably, the disc member 30 and the cylindrical member 31 are not fixed to each other so that they can be separated from each other when performing maintenance.

Inside the housing 10, a rod 35, which extends along the axial line L, is disposed so as to hermetically and slidably extend through the partition wall member 13. A tip end portion (lower end portion) of the rod 35 extends through the center of the main valve disc 20 to a position below the main valve disc 20. The sub-valve disc 25 is provided at the tip end portion of the rod 35. To a base end portion (upper end portion) of the rod 35, an opening-closing operation mechanism 50, for opening and closing the sub-valve disc 25 and the main valve disc 20, is coupled.

The rod 35 has a first rod portion 36, which extends through the disc member 30 and the cylindrical member 31 of the main valve disc 20, on the tip end side and a second rod portion 37, which is coupled to the opening-closing operation mechanism 50, on the base end side. The first rod portion 36 and the second rod portion 37 are separably coupled by using a method such as screwing. The sub-valve disc 25, which has a disc shape, is formed at a tip end of the first rod portion 36. A piston 51 of the opening-closing operation mechanism 50 is coupled to a base end of the second rod portion 37.

In the example shown in the figures, the sub-valve disc 25 is integrally formed with the first rod portion 36. However, the sub-valve disc 25 may be formed independently from the first rod portion 36 and coupled to the first rod portion 36. A numeral 38 in the figures denotes an annular sub-valve seal attached to the sub-valve disc 25.

On an inner periphery of the cylindrical member 31 of the main valve disc 20, a bearing member 39, which guides the first rod portion 36 of the rod 35, and a seal member 40, which seals a space between the inner periphery of the cylindrical member 31 and an outer periphery of the first rod portion 36, are provided.

Because the main valve disc 20 is attached to the first rod portion 36 of the rod 35 as described above, after separating the first housing member 11 of the housing 10 from the partition wall member 13, it is possible to remove the main valve disc 20 from the rod 35 and also from the first rod portion 36 by separating the first rod portion 36 of the rod 35 from the second rod portion 37. Moreover, after the main valve disc 20 has been removed from the rod 35, it is also possible to separate the disc member 30 and the cylindrical member 31 from each other.

On an outer periphery the rod 35, a tubular spring receiving member 41 is disposed at a position above the cylindrical member 31 of the main valve disc 20. Although the spring receiving member 41 is displaceable along the rod 35, the spring receiving member 41 is configured in such a way that, by being engaged with a locking ring 42 formed on the second rod portion 37, the spring receiving member 41 cannot move downward from the engaged position.

In the spring receiving member 41, a cylindrical cover portion 41a, which extends toward the main valve disc 20, is formed. The cylindrical member 31 of the main valve disc 20 is separably fitted into the inside of the cover portion 41a.

In the spring receiving member 41, a first spring seat 41b having a flange-like shape is formed at a lower end portion thereof, and a second spring seat 41c is formed at an upper end portion thereof. Between the first spring seat 41b and a main spring seat 13a, which is formed in the partition wall member 13, a main valve spring 44 is interposed in a compressed state. The main valve spring 44 urges the main valve disc 20 in a direction such that the main valve disc 20 contacts the main valve seat 19. Between the second spring seat 41c and a sub-spring seat 35a, which is formed on the second rod portion 37 of the rod 35, a sub-valve spring 45 is interposed in a compressed state. The sub-valve spring 45 urges the sub-valve disc 25 via the rod 35 in a direction such that the sub-valve disc 25 contacts the sub-valve seat 24.

To the cylindrical member 31 of the main valve disc 20, one end of a bellows 46, which is made of a metal and which is extendable and shrinkable, is fixed via a ring-shaped attachment portion 46a, which is integrated with the bellows 46, by using a method such as welding. The other end of the bellows 46 is coupled to a ring-shaped support member 47, and the support member 47 is held between the first housing member 11 of the housing 10 and the partition wall member 13.

The bellows 46 surrounds the rod 35, the spring receiving member 41, the main valve spring 44, the sub-valve spring 45, and a part of the main valve disc 20, and isolates these from a process gas.

After separating the first housing member 11 of the housing 10 from the partition wall member 13, it is possible to remove the bellows 46 together with the main valve disc 20 when separating the first rod portion 36 of the rod 35 from the second rod portion 37 and removing the main valve disc 20 from the rod 35.

In contrast, because the spring receiving member 41 is engaged with the second rod portion 37 of the rod 35 and remains at the position thereof, the main valve spring 44 and the sub-valve spring 45 also remain at the positions thereof, as with the spring receiving member 41.

Thus, the vacuum valve allows the bellows 46, the main valve disc 20, the sub-valve disc 25, and the like to be separated from other components and easily taken out to the outside, in order to perform inspection, replacement, and the like of the bellows 46, the main valve seal 32, the sub-valve seal 38, and the like, which tend to deteriorate due to contact with a process gas. Therefore, it is easy to perform maintenance and inspection of the vacuum valve, it is easy to perform a disassembling operation, and it is easy to perform a reassembling operation after maintenance or inspection.

Next, the opening-closing operation mechanism 50 will be described. As illustrated in FIG. 2, the opening-closing operation mechanism 50 is composed of one fluid-pressure cylinder, and the fluid-pressure cylinder in the present embodiment is an air cylinder.

The opening-closing operation mechanism 50 has a cylinder hole 52, which is formed inside the second housing member 12. Inside the cylinder hole 52, the piston 51 is accommodated so as to be slidable in the axial line L direction via a ring-shaped guide member 53 and a piston seal 54, which are attached to an outer periphery of the piston 51.

One end of the cylinder hole 52 is blocked by an end plate 55, which is hermetically attached to the second housing member 12. The other end of the cylinder hole 52 is blocked by the partition wall member 13 and an adjustment nut 71 and a stopper 72, which are included in an opening-degree adjustment mechanism 70 described below.

The inside of the cylinder hole 52 is divided by the piston 51 into a first pressure chamber 56 between the piston 51 and the end plate 55 and a second pressure chamber 57 between the piston 51 and the partition wall member 13 and the adjustment nut 71. The first pressure chamber 56 and the second pressure chamber 57 individually communicate with a first operation port 58 and a second operation port 59, which are formed in a side surface of the second housing member 12.

The base end portion, that is, the upper end portion of the rod 35, hermetically extends through a center hole of the partition wall member 13, extends into the cylinder hole 52, and is coupled to the piston 51.

A numeral 60 in the figures denotes a bearing member that is interposed between an inner periphery of the partition wall member 13 and an outer periphery of the rod 35. A numeral 61 in the figures denotes a seal member that seals a space between the inner periphery of the partition wall member 13 and the outer periphery of the rod 35.

When the main valve disc 20 is in contact with the main valve seat 19 and closes the main flow channel 17 and the sub-valve disc 25 is in contact with the sub-valve seat 24 and closes the sub-flow channel 21, the piston 51 is urged upward in the figures by the sub-valve spring 45, and thereby occupies a position (valve closing position) that is separated from a contact surface 72a at an upper end of the stopper 72.

Figure 5:
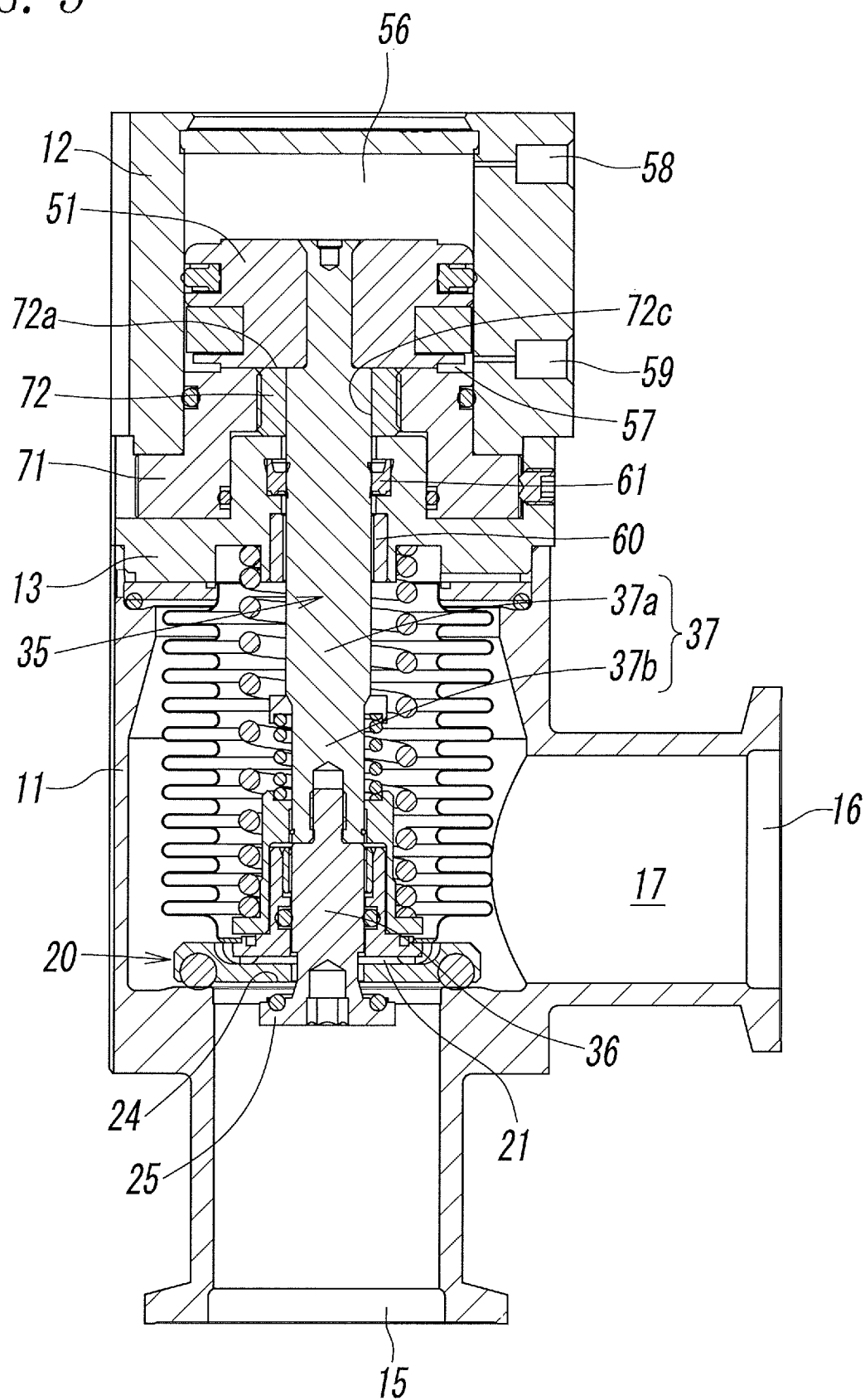
FIG. 5 is a sectional view of the vacuum valve in a state in which a sub-valve disc opens the sub-flow channel and a main valve disc closes the main flow channel.

From this state, as illustrated in FIG. 5, when pressure air is supplied through the first operation port 58 to the first pressure chamber 56 and the second pressure chamber 57 is opened through the second operation port 59 to the outside, the piston 51 moves downward (advances) to a position such that the piston 51 contacts the contact surface 72a of the stopper 72 and the rod 35 also moves downward (advances) together with the piston 51. Therefore, the sub-valve disc 25 separates from the sub-valve seat 24 and the sub-flow channel 21 opens. As illustrated in FIG. 2, the stroke S of the sub-valve disc 25 at this time is the distance between a lower surface of the piston 51 when the sub-valve disc 25 is located at the valve closing position and the contact surface 72a of the stopper 72.

Figure 6:
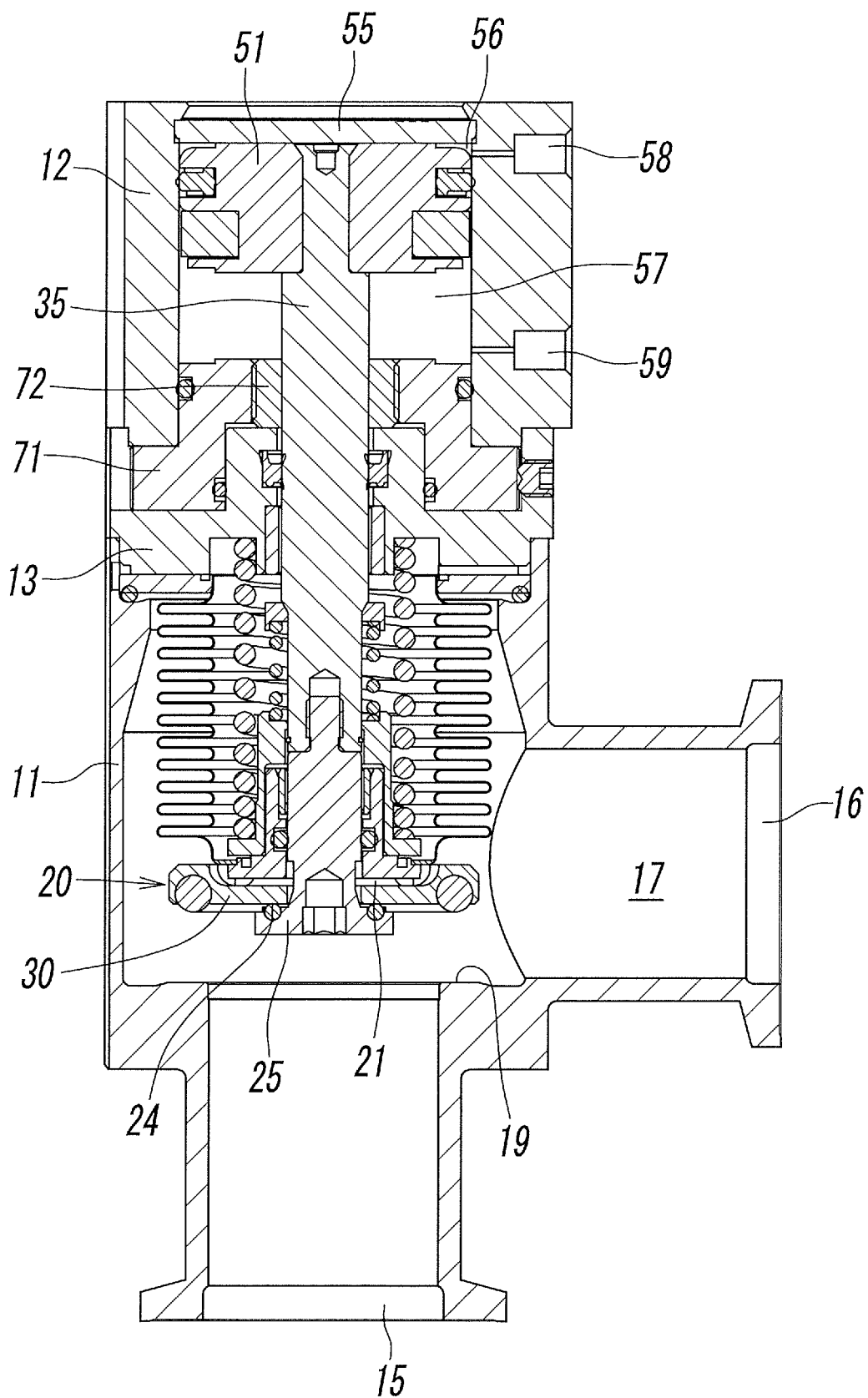
FIG. 6 is a sectional view of the vacuum valve in a state in which the main valve disc opens the main flow channel.

Next, when pressure air is supplied through the second operation port 59 to the second pressure chamber 57 and the first pressure chamber 56 is opened through the first operation port 58 to the outside, as illustrated in FIG. 6, the piston 51 moves upward (retreats) to a position such that the piston 51 contacts the end plate 55 and the rod 35 also moves upward (retreats) together with the piston 51. While the rod 35 moves upward, the sub-valve disc 25 contacts the main valve disc 20 and lifts the main valve disc 20, and therefore the main valve disc 20 separates from the main valve seat 19 and the main flow channel 17 opens. At this time, although the sub-valve disc 25 contacts the sub-valve seat 24 and thereby the sub-flow channel 21 is closed, this does not cause a problem regarding the operation of the vacuum valve.

In the opening-closing operation mechanism 50, the opening-degree adjustment mechanism 70 for adjusting the opening degree of the sub-valve disc 25 is provided. The opening-degree adjustment mechanism 70 is composed of the adjustment nut 71 and the stopper 72, and the specific structure thereof is as follows.

First, the specific structure of the partition wall member 13 will be described. As is clear from FIG. 7, an annular recessed portion 13b is formed in an upper surface of the partition wall member 13; a cylindrical portion 13c, which has a height that is about the same as the depth of the recessed portion 13b, is formed at a central position of the recessed portion 13b; and the rod 35 extends through the center of the cylindrical portion 13c. An operation opening 13d, which communicates with the recessed portion 13b, is provided in a side surface of the partition wall member 13.

The adjustment nut 71 includes a cylindrical fitting portion 71a, which is fitted into the cylinder hole 52, and a ring-shaped operation portion 71b, which is formed on a lower part of the fitting portion 71a. At the center of the adjustment nut 71, a fitting portion 71c, into which the cylindrical portion 13c of the partition wall member 13 is fitted, and a threaded hole 71d, with which the stopper 72 meshes, are formed. The outside diameter of the operation portion 71b is larger than the outside diameter of the fitting portion 71a, and the height of the operation portion 71b in the axial line L direction is slightly smaller than the depth of the recessed portion 13b of the partition wall member 13.

The operation portion 71b is accommodated in the recessed portion 13b of the partition wall member 13, and the operation portion 71b is interposed between a bottom surface of the recessed portion 13b of the partition wall member 13 and a lower end surface of the second housing member 12 with a very small gap therebetween. Thus, the adjustment nut 71 is disposed so as to be rotatable around the axial line L in a state in which movement thereof in the axial line L direction is restricted.

On the outer periphery of the operation portion 71b, protrusions-and-recesses 71e, which have a gear-like shape for preventing slipping, are formed. A part of the operation portion 71b is exposed through the operation opening 13d from a side surface of the partition wall member 13 to the outside, so that it is possible to operate the operation portion 71b with a finger through the operation opening 13d. A fixing screw 75 is attached to a side surface of the partition wall member 13 so that the adjustment nut 71 may not rotate except for the time for adjusting the opening degree. The adjustment nut 71 is fixed by tightening the fixing screw 75 and causing a tip end of the fixing screw 75 to engage with a side surface of the adjustment nut 71.

A numeral 73 in the figures denotes a seal member that seals a space between an outer periphery of the fitting portion 71a and an inner periphery of the cylinder hole 52. A numeral 74 in the figures denotes a seal member that seals a space between an inner periphery of the adjustment nut 71 and an outer periphery of the cylindrical portion 13c of the partition wall member 13.

The stopper 72 is a member having a cylindrical shape, and has a male thread 72b, which meshes with the threaded hole 71d of the adjustment nut 71, on an outer periphery thereof. The rod 35 slidably extends through a center hole 72c of the stopper 72. In this case, although the stopper 72 is displaceable relative to the rod 35 in the axial line L direction, in order to prevent the stopper 72 from rotating relative to the rod 35 around the axial line L, the center hole 72c and the rod 35 are formed so as to have hexagonal cross-sectional shapes.

As illustrated in FIG. 5, a portion of the rod 35 having a hexagonal shape is only a large-diameter portion 37a, which is on the base end side of the second rod portion 37. A small-diameter portion 37b, which is on the tip end side of the second rod portion 37, and the first rod portion 36, which is coupled to the small-diameter portion 37b, have circular cross-sectional shapes and have the same diameter. Therefore, the bearing member 60 and the seal member 61, which are attached to the center hole of the partition wall member 13, are members that can adapt to the rod 35 having a hexagonal shape.

Figure 7:
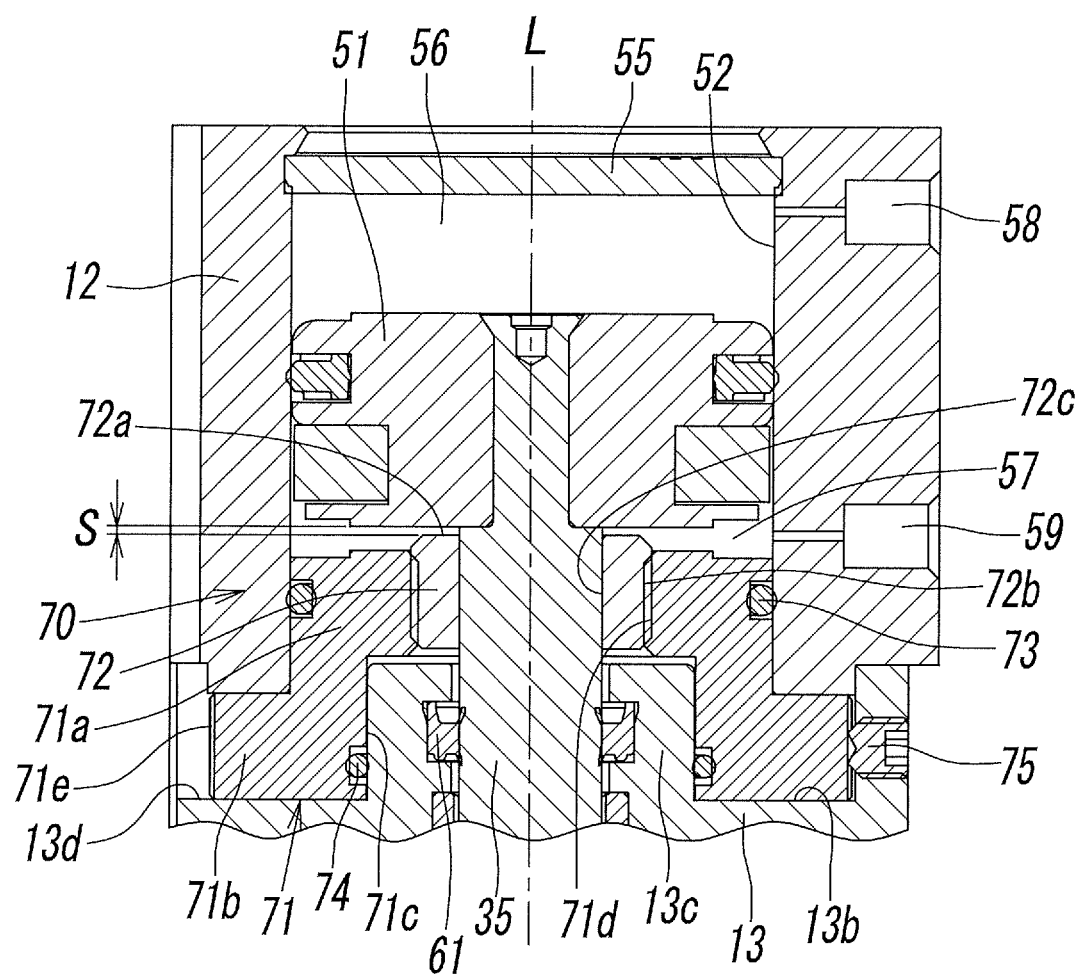
FIG. 7 is a partial enlarged view of the vacuum valve in a state in which the opening degree of the sub-valve disc is adjusted by an opening-degree adjustment mechanism.

In the opening-degree adjustment mechanism 70, from a state in which the contact surface 72a at the upper end of the stopper 72 is located at the same position as the upper end surface of the adjustment nut 71 as illustrated in FIG. 2, when the fixing screw 75 is loosened and the adjustment nut 71 is rotated in one direction by operating the operation portion 71b, because the stopper 72 cannot rotate relative to the rod 35, the stopper becomes displaced upward along the axial line L and the contact surface 72a protrudes from the adjustment nut 71 as illustrated in FIG. 7. By the amount of protrusion, the stroke S of the sub-valve disc 25, that is, the opening degree decreases.

When the adjustment nut 71 is rotated in the opposite direction in a state in which the contact surface 72a of the stopper 72 protrudes from the upper end surface of the adjustment nut 71, the stopper 72 moves downward along the axial line L, and therefore the amount of protrusion of the contact surface 72a decreases and the stroke S of the sub-valve disc 25 increases by the decreased amount.

In the embodiment described above, the opening-closing operation mechanism 50 is formed of a fluid-pressure cylinder. However, the opening-closing operation mechanism 50 may be formed of an electric motor. In this case, the opening-degree adjustment mechanism 70 may be omitted.

REFERENCE SIGNS LIST 10 housing
13 partition wall member
13a main spring seat
13d operation opening
15 first port
16 second port
17 main flow channel
18 valve chamber
19 main valve seat
20 main valve disc
21 sub-flow channel
24 sub-valve seat
25 sub-valve disc
30 disc member
31 cylindrical member
35 rod
35a sub-spring seat
36 first rod portion
37 second rod portion
39 bearing member
40 seal member
41 spring receiving member
41a cover portion
41b first spring seat
41c second spring seat
44 main valve spring
45 sub-valve spring
46 bellows
50 opening-closing operation mechanism
51 piston
56 first pressure chamber
57 second pressure chamber
70 opening-degree adjustment mechanism
71 adjustment nut
72 stopper
L axial line

The invention claimed is:

1. A vacuum valve comprising: a first port and a second port that are formed in a housing; a main flow channel that is formed inside the housing so as to connect the first port and the second port; a main valve seat that surrounds the main flow channel; a main valve disc that opens and closes the main flow channel by contacting and separating from the main valve seat; a sub-flow channel that is formed inside the main valve disc so as to be in parallel with the main flow channel; a sub-valve seat that is formed on the main valve disc so as to surround the sub-flow channel; a sub-valve disc that opens and closes the sub-flow channel by contacting and separating from the sub-valve seat; and an opening-closing operation mechanism that performs operations of opening and closing the main valve disc and the sub-valve disc, wherein a rod is disposed inside the housing so as to slidably extend through the main valve disc, the opening-closing operation mechanism is coupled to a base end portion that is one end of the rod in an axial line direction, the sub-valve disc is disposed at a tip end portion that is the other end of the rod in the axial line direction so as to contact and separate from the main valve disc at a position outside the main valve disc, and the sub-valve seat is formed on a part of an outer surface of the main valve disc that the sub-valve disc contacts, wherein the main valve disc includes a disc member that contacts and separates from the main valve seat and a cylindrical member that is formed independently from the disc member and is combined with the disc member; the sub-flow channel is formed between the disc member and the cylindrical member, and the sub-valve seat is formed on the disc member; and a bearing member that guides the rod and a seal member that seals a space between an inner periphery of the cylindrical member and an outer periphery of the rod are provided on an inner periphery of the cylindrical member, wherein the sub-valve disc opens and closes the sub-flow channel by being operated directly by the rod, and wherein the main valve disc opens and closes the main flow channel by being operated via the sub-valve disc by the rod.

2. The vacuum valve according to claim 1, wherein the rod includes a first rod portion on a tip end side and a second rod portion on a base end side, the first rod portion and the second rod portion being separably coupled, wherein the first rod portion extends through the main valve disc, and the sub-valve disc is provided at a tip end of the first rod portion, wherein the second rod portion is coupled to the opening-closing operation mechanism, and wherein the main valve disc is removable from the rod by separating the first rod portion from the second rod portion.

3. The vacuum valve according to claim 2, wherein a spring receiving member having a tubular shape is attached to the rod in such a way that, although the spring receiving member is displaceable along the rod, the spring receiving member becomes inseparable from the second rod portion by engaging with the second rod portion, wherein a tubular cover portion into which the cylindrical member of the main valve disc is fitted, a first spring seat, and a second spring seat are provided in the spring receiving member, wherein a main valve spring that urges the main valve disc in a direction such that the main valve disc contacts the main valve seat is interposed in a compressed state between the first spring seat and a main spring seat that is formed in the housing, wherein a sub-valve spring that urges the sub-valve disc via the rod in a direction such that the sub-valve disc contacts the sub-valve seat is interposed in a compressed state between the second spring seat and a sub-spring seat that is formed on the rod, and wherein one end of a bellows that surrounds the main valve spring and the sub-valve spring is coupled to the main valve disc, and the other end of the bellows is coupled to the housing.

4. The vacuum valve according to claim 1,
wherein the sub-valve disc separates from the sub-valve seat and opens the sub-flow channel due to an advancing motion of the rod, and
wherein the main valve disc becomes displaced via the sub-valve disc, separates from the main valve seat, and opens the main flow channel due to a retreating motion of the rod.

5. The vacuum valve according to claim 1,
wherein the opening-closing operation mechanism is formed of one fluid-pressure cylinder and includes a piston that is coupled to the rod, a first pressure chamber that is formed on one side of the piston, and a second pressure chamber that is formed on the other side of the piston; the piston is coupled to the rod; when a pressure fluid is supplied to the first pressure chamber, the piston and the rod advance and the sub-valve disc opens the sub-flow channel; and, when a pressure fluid is supplied to the second pressure chamber, the piston and the rod retreat and the main valve disc opens the main flow channel.

6. A vacuum valve comprising: a first port and a second port that are formed in a housing; a main flow channel that is formed inside the housing so as to connect the first port and the second port; a main valve seat that surrounds the main flow channel; a main valve disc that opens and closes the main flow channel by contacting and separating from the main valve seat a sub-flow channel that is formed inside the main valve disc so as to be in parallel with the main flow channel; a sub-valve seat that is formed on the main valve disc so as to surround the sub-flow channel; a sub-valve disc that opens and closes the sub-flow channel by contacting and separating from the sub-valve seat and an opening-closing operation mechanism that performs operations of opening and closing the main valve disc and the sub-valve disc,
wherein a rod is disposed inside the housing so as to slidably extend through the main valve disc, the opening-closing operation mechanism is coupled to a base end portion that is one end of the rod in an axial line direction, the sub-valve disc is disposed at a tip end portion that is the other end of the rod in the axial line direction so as to contact and separate from the main valve disc at a position outside the main valve disc, and the sub-valve seat is formed on a part of an outer surface of the main valve disc that the sub-valve disc contacts,
wherein the sub-valve disc opens and closes the sub-flow channel by being operated directly by the rod,
wherein the main valve disc opens and closes the main flow channel by being operated via the sub-valve disc by the rod, and
wherein the opening-degree adjustment mechanism includes an adjustment nut that is rotationally operable through an operation opening that is formed in a side surface of the housing and a stopper with which the adjustment nut meshes, the stopper is displaceable in the axial line direction by rotationally operating the adjustment nut, and the opening degree of the sub-valve disc is adjusted in accordance with a position of the stopper.

* * * * *